United States Patent [19]

Strandberg

[11] 4,097,159
[45] Jun. 27, 1978

[54] METHOD OF, AND DEVICE FOR EFFECTING CONTACT-FREE MEASUREMENT BY OPTICAL SCANNING

[75] Inventor: Per Strandberg, Vesteras, Sweden

[73] Assignee: Kockums Automation AB, Vesteras, Sweden

[21] Appl. No.: 712,179

[22] Filed: Aug. 6, 1976

[30] Foreign Application Priority Data

Oct. 15, 1975 Sweden .............................. 7511507

[51] Int. Cl.² ........................................... G01B 11/04
[52] U.S. Cl. ..................................... 356/167; 250/224
[58] Field of Search ....................... 356/158, 160, 167; 250/224, 560

[56] References Cited

U.S. PATENT DOCUMENTS 3,806,253  4/1974  Denton .................................. 356/160

FOREIGN PATENT DOCUMENTS 1,332,897  10/1973  United Kingdom ................. 356/167

227,599  2/1969  U.S.S.R. .............................. 356/167

Primary Examiner—John K. Corbin
Assistant Examiner—Wm. H. Punter
Attorney, Agent, or Firm—Ross, Ross & Flavin

[57] ABSTRACT

To measure the cross-section of an object in a contact-free manner (that is to say without contacting the object) use is made of an optical sensor system and means for causing relative movement of the sensor system and the object being measured, the sensor system comprising at least two emitters which emit respective scanning rays at an angle to one another and directed to respective receivers which supply signals to an evaluation unit upon interruption of each ray by the object and subsequent cessation of said interruption; at least two of said co-operating emitter-receiver pairs are so arranged that their scanning rays (or projections thereof on a common plane parallel to the scanning rays) cross one another and extend at angles to the direction of relative movement.

22 Claims, 7 Drawing Figures

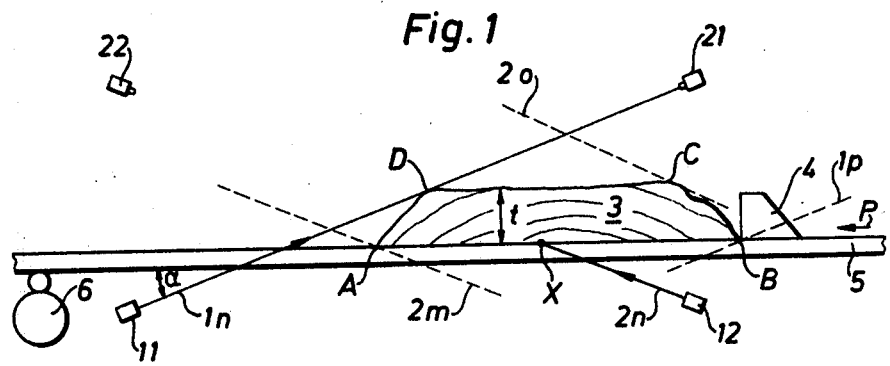
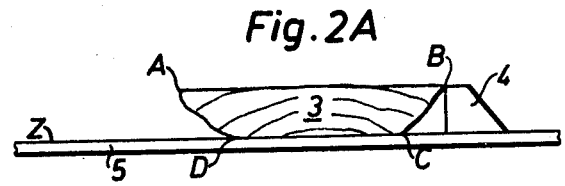
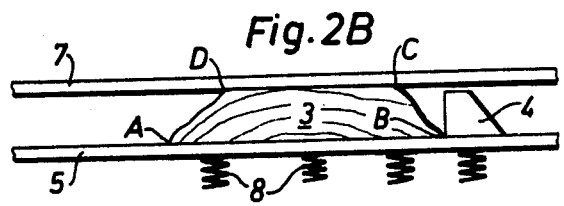
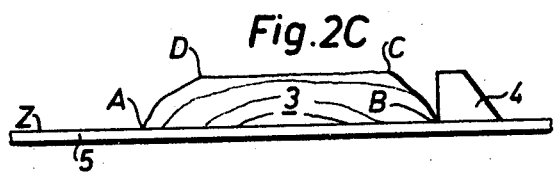
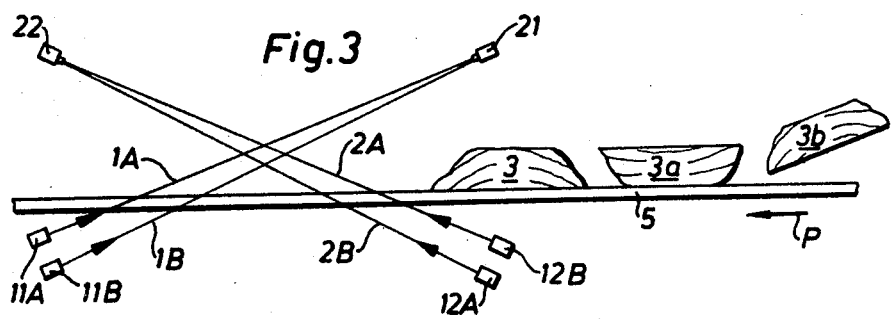

METHOD OF, AND DEVICE FOR EFFECTING CONTACT-FREE MEASUREMENT BY OPTICAL SCANNING

The present invention relates to a method of and a device for effecting contact-free measurement of an object by optical scanning, the measurement being such that in the cross-section of said object three or four measuring points, representing, in said cross-section, for instance the longitudinal edges of the object or other relevant positions, are determined.

Notwithstanding the fact that the invention will be herein exemplified with reference to examples in which the object to be measured is a board or plank, such as is produced by cutting a tree, having edges which are roughly bevelled in configuration, and not withstanding the fact that the invention is extraordinarily-well suited for such use, the invention is not restricted to said use or to application here the objects have similar shapes.

In the saw mill industry, it is known to scan objects (for instance boards) optically by means of various arrangements comprising at least one light transmitter and at least one light receiver by which light signals are received from the transmitter and are converted into electrical signals which are fed to a calculator unit, sometimes after the signals have been suitably adapted, for instance by amplification, said calculator unit being, for instance, a computer facility where the signals are processed according to a program that has been designed in order to obtain an output signal or a series of output signals suited for indication and/or control purposes.

In using some of the known computer programs, in order to obtain the optimum of a useful surface or volume, the measurement on one and the same object has to be carried out in several mutually-spaced measurement planes, since the cross sections of the boards vary along the lengths of the boards.

Prior optical scanning methods and devices work either with reflected light or according to a screening principle. In the first case, the measurement result is entirely dependent upon the brightness contrast (the difference in light reflection capacity) between the usually darker roughly bevelled edge and the clean sawn planar surface and/or upon there being a sharply defined border line between the roughly bevelled edge and the clean sawn planar surface. Therefore, the result of the measuring is relatively unreliable since in practice minor brightness differences as well as completely indefinite transitions between the roughly bevelled edges and the clean sawn surfaces can occur rather frequently.

When measuring according to the screening principle, a shadow thrown by the object, when it is illuminated, for instance onto a system of light receivers, is measured. The resolution, i.e. the accuracy of measurement, depends on the spacing between the different receivers. Usually, only the largest dimension, i.e. the wider clean sawn planar surface of a board, can be measured, since this surface determines the extension of a shadow. For determining the optimum of a surface or volume that can be achieved, however, it is desirable to know the exact dimensions of the narrower clean sawn surface, (i.e. the upper side).

An object of the present invention is to provide a method and a device of the kind aforesaid, working according to the screening principle, but not based on the measurement of a shadow. The invention is based on a method where the object to be measured has three or four critical measuring points and is moved relative a sensor system which comprises at least two emitters, each one emitting a respective scanning ray, and comprising at least two receivers aligned with the scanning rays, said receivers serving to generate electric signals in dependence, on the one hand, upon the screening-off or obscuring of the scanning rays, and on the other hand the admission of said rays by the object to be measured, said electric signals, together with signals from a position indicator which indicates the relative movement of said object, being supplied to a calculator unit, for instance a computer or the like.

According to the invention use is made of at least two scanning rays which, (or projections, in a plane parallel to said rays of which), cross each other in inclined disposition relative to the direction of the relative movement of the object to be measured, an output signal that is obtained, when a first scanning ray of a pair of scanning rays in interrupted, being interpreted as an indication of a measurement point in the cross-section of the object to be measured, and the output signal that is obtained when the interruption of the second scanning ray of the pair of rays terminates being interpreted as an indication of another measurement point adjacent, in the cross-section of the object, the same edge and extending substantially in the direction of the relative movement.

The term "relative movement" is used herein, of course, because the object to be measured can be moved whilst the sensor system is stationary, or vice versa, or both the object and the sensor system may move in the same or opposite directions.

The inclination or slope of the scanning rays relative to the direction of movement determines, on the one hand, the resolution of measurement, and on the other hand, the extent to which hidden corners between the two edges of the object can be recognized, as will be described in more detail later in connection with certain specific embodiments. Suitable angles of inclination are determined entirely by the shapes of the objects to be measured.

In this connection, it can be noted that it basically is of no importance where the crossing point of the scanning rays is located. What is essential is that the scanning rays should form a "measuring cross" by means of which a parallelogram is determined in which the object to be measured can be inscribed, sides of the parallelogram being parallel to the related scanning rays. In this way, information is obtained as to the dimensions of the object to be measured, in two directions. Many objects have cross-sectional shapes where the tangential points of said scanning rays comprise all the necessary measurement information.

The method according to the invention is applicable also in connection with the measurement of objects having three or four edges when the orientation of the object and the direction of movement and the inclination of the scanning rays are so selected that it is known in advance that the points of tangency (i.e. the corner points in the cross section of the object) are the measurement points sought. When the position of a corner point relative a known reference plane parallel to the direction of movement is known, the actual position of the corner point can be determined. This knowledge can be obtained in different ways, for instance by mechanically orientating the object, some or several of the measurements already being known, or by means of a two-ray measurement as in the present invention.

In a further development of the invention, each emitter co-operates, in its measuring plane, (i.e. in the plane in which the measured cross-section of the object is located), with two receivers, or vice versa, each receiver co-operating, in its measuring plane, with two emitters. The twin elements are, for instance, so arranged that the angle between two related scanning rays is approximately 3° to 45°. By this arrangement, where four scanning rays (or the projections thereof on a common plane) cross each other, information is obtained on the four corner points of a trapezoid-shaped object without any need for having the object located on some predetermined reference plane. If the object to be measured is a parallel trapezoid with its parallel sides subtending a known angle to the direction of movement, only three scanning rays are required, i.e. one twin element and one single element.

When measuring objects having a cross section that varies along the length thereof, which, as already has been mentioned in the introduction hereto, is the case with boards, the scanning is carried out in several parallel measuring planes, the output signals from the receivers preferably being supplied to one single calculator unit where they are processed according to a set program, for instance for optimizing purposes.

A device for carrying out the method of the invention includes a sensor system comprising at least two scanning ray emitters and at least two receivers for said scanning rays, and means for causing relative movement between the object to be measured and the sensor system, and is characterized in that, of said sensor system, at least two co-operating transmitter-receiver pairs are arranged so that the respective scanning rays (or the projections thereof on a projection plane parallel to the scanning rays) cross each other, and in that the scanning rays extend at an angle relative the direction of the said relative movement.

In the simplest case, each receiver comprises a photo detector of any conventional type without any supplements. However, with advantage, it may be provided with a light conductor, a front surface or front portion thereof being located so that it can receive the scanning ray from the respective transmitter, thus forming the optical input of the entire receiver, the end portion of the light conductor being arranged opposite that portion of the photo detector which is intended for receiving light and which otherwise would have formed the optical input of the receiver. With such an arrangement, a particular advantage is obtained in the case where use is made of several parallel measuring planes, since instead of having to arrange photo detectors, with respective printed circuit boards, in each measuring plane, these electronic components (i.e. the detectors and their circuit boards) can be concentrated in a single box in which the rest of the electronic equipment is also accommodated.

A further simplification can also be obtained with this arrangement in that it may be such that several emitters are activated in succession according to the time multiplex method, and the corresponding light conductors at the receiver side are fed to one and the same photo detector. Thus, one obtains a constructional simplification in that a number of photo detectors, with related printed circuit boards, can be eliminated entirely.

In contrast to the known reflection measurement methods, there is no critical limit in the method of the invention as to which portion is to be recognized as an edge or as the upper side of the article to be measured, is in contrast to the reflection measurement methods.

Basically, any suitable light source can be used as each emitter. Since the light energy level required for the scanning is not particularly high, light-emitting diodes are particularly suitable.

It is particularly advantageous to use light-emitting diodes that radiate invisible infra-red light which can be received by a photo transistor. By using modulated direct light, a high level of immunity against interference is obtained. Insensitivity to external illumination by visible and invisible light is achieved and the risk of interference by light that has not been modulated to exactly the same frequency at the emitters is eliminated.

Expressions such as "optical" and "scanning ray," and associated terms, as used in this specification and the accompanying claims, therefore pertain both to the visible spectrum and to the invisible spectrum. By "optical input" and "optical output" are meant respectively those portions of an operation element through which a received ray is allowed to enter and a transmitted ray is allowed to leave.

For aligning the scanning rays with the connecting line between the emitter and its respective receiver, apertured elements or diaphragm elements are preferably arranged in front of the emitter and/or receiver.

Whilst an apertured element or diaphragm element arranged in front of the emitter serves to direct the transmitted ray in a predetermined direction, an apertured element or diaphragm element arranged in front of the receiver performs a selective action in that only the related scanning ray, and no other incidental scanning ray, is selected for transmission. The screening off of other interfering radiation is better the smaller the diaphragm elements are made, and therefore said elements should be selected as small as possible with due consideration of the fact that it should be easy to align the emitter and the respective receiver relative to each other.

The simplest way of making an apertured element or diaphragm element is to make it in the form of a plate having a diaphragm or like opening for the optical input or output, as the case may be of each receiver or emitter, this plate being arranged at a predetermined distance in front of the receiver or transmitter. In this connection, the space between the front surface of the receiver or emitter or emitters, respectively, and the plate, may be arranged as a channel in which a pressurized gaseous medium, for instance pressurized air, can be blown in in order to keep clean from dust, and other foreign matter, both the apertures or diaphragm openings and the optical inputs or outputs.

Of course, the emitter as well as the receiver can be provided with conventional lens systems, if desired.

The invention will be described further, by way of example, with reference to the accompanying drawings, in which:

FIG. 1 is a side elevation which serves to illustrate diagrammatically how the method of the invention is carried into effect;

FIGS. 2A, 2B and 2C illustrate, diagrammatically, three different and possible arrangements of the object to be measured relative to the reference plane;

FIG. 3 is a schematic representation, illustrating a modification of the method according to the invention.

Figure 4:
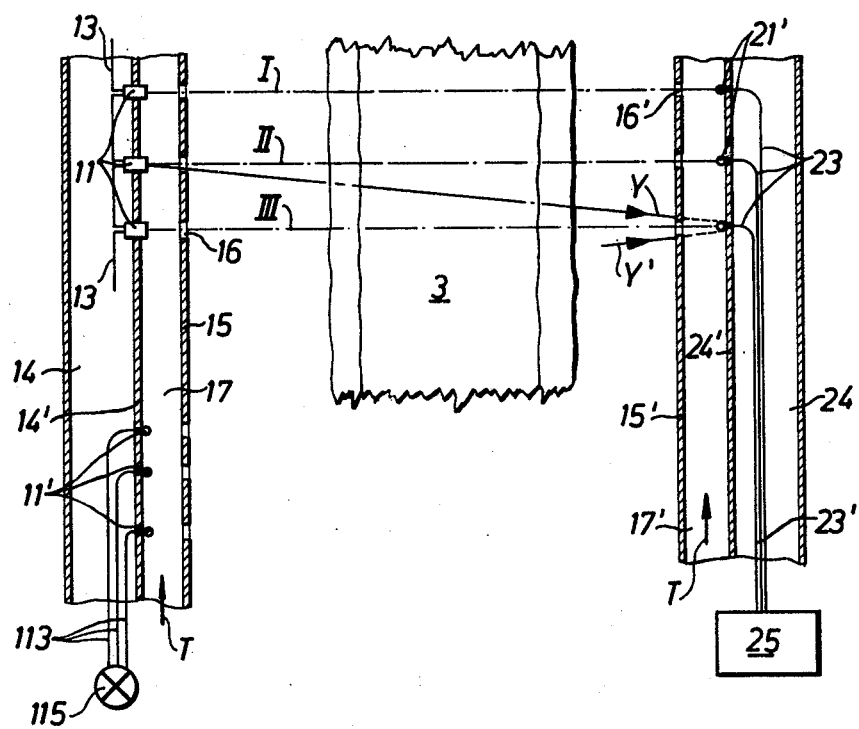
FIGS. 4 and 5 illustrate, schematically, respectively in sectional plan and sectional elevation, a device for scanning in several measuring planes, in accordance with the invention.

Referring firstly to FIG. 1, a board or plank 3 is transported in the direction indicated by arrow P on a conveyor 5 provided with carriers 4. A position indicator 6, for instance a pulse generator, provides signals corresponding to the movement of the conveyor 5 and therefore also to the movement of the board 3. A driving arrangement for the conveyor 5 is of conventional type and for the sake of simplicity is not shown in the drawing.

Below the conveyor 5, (which essentially is translucent to or does not obstruct radiation, as is the case, for instance, with known chain conveyors) are located two emitters 11 and 12, and above the conveyor are arranged two co-operating receivers 21 and 22. The emitter 11 generates a scanning ray $1n$ and the emitter 12 generates a scanning ray $2n$. The two scanning rays 11, 12 (or at least portions thereof), which define respective measuring crosses, are shown in the drawing at four succeeding instants of time as indicated by the suffixes $m$, $n$, $o$ and $p$. The state of the scanning rays at the second instant $n$ of the succession of time instants is shown in solid lines $1n$ and $2n$. Of course, the rays $1p$, $2m$, $2o$ actually start from the emitters 11 and 12 and are directed towards the respective receivers 21 and 22, since it is still a question of the same rays, and in fact it is the board 3 which is in different positions at the different instants $m$, $n$, $o$ and $p$. However, from the drawing it will clearly be understood that the scanning method of the invention also can be carried out so that the object to be measured is stationary and the system consisting of the emitters and receivers is moved.

The second instant $n$ relates to the instant when the scanning ray $1n$ is just about to be interrupted by upper left corner point D of the cross-section of the board 3, the point D being one of the measuring points.

In this position, the scanning ray $2n$ is obscured, or screened-off at X at the lower surface of the board, and actually has been screened-off for some time, i.e. since the first instant $m$ when the board 3 was located at such a position (displaced towards the right in the drawing) that lower left corner point A (another one of the measurement points) of the cross-section has interrupted the scanning ray from the emitter 12, represented in the drawing as $2m$ (in other words: when A was located at X).

Due to the change from brightness to darkness, a signal has been obtained in the receiver 22 at the instant $m$, and by means of said signal, in correlation with the pulse train from the position indicator 6, the position of A has been determined. An analog signal corresponding to the corner point D is just being originated in the receiver 21 at the instant $n$ in consequence of the interruption of the ray $1b$ and the corresponding change from brightness to darkness.

At a third instant $o$, upper right corner point C of the cross-section (a further measuring point) ceases to obscure the ray $2o$. Because of the change from darkness to brightness, a signal is obtained in the receiver 22, and in correlation with signals from the position indicator 6, the position of point C is determined. In a similar manner, at the fourth instant $p$, the scanning ray $1p$ is exposed to the respective receiver by lower right corner point B (the last measuring point) whereby the position of said corner point is determined.

Actually, the obtained position determinations are projections of the corner points A, B, C and D on a reference plane Z (FIGS. 2A to 2C). In order to determine the exact mutual position of the corner points, information is needed also about thickness $t$ of the board which, however, is a parameter that in practice is usually known in advance.

In FIGS. 2A, 2B, 2C, there are shown three evaluation possibilities by means of the reference plane Z which either can be formed of the conveyor surface (2A, 2C) per se or can be defined for instance by special guide rails 7 (2B), against which the object to be measured is pushed by means of pushing members. In these FIGS. 2A and 2B, information is obtained about the essential corner points C and D even if the thickness $t$ is not known, and when $t$ is known, information is obtained also about the corner points A and B. In the arrangement as shown in FIG. 2C, information is obtained on the corner points A and B, but for determining the corner points C and D it is necessary to know the thickness $t$.

In the special case relating to measurement of width and thickness of objects having rectangular cross section, all three methods provide information on height and width. If the object has trapezoid shape, information on the distance from corner A to the reference plane Z and from corner B to the reference plane Z is necessary for determining the corner points A and B, respectively, according to FIGS. 2A and 2B.

Corresponding conditions pertain to the points C and D in FIG. 2C.

It will be understood from the drawing that the emitters and receivers can be arranged on arbitrary sides relative the path of the object to be measured, and that the inclination of the scanning rays relative said path, i.e. the angle $a$, does not affect the measuring principle per se, but only affects the accuracy of the measurement and the condition as to what cross-sectional shapes can be measured (in dependence upon the inclination of the said edges thereof). For instance, if the scanning ray has an inclination of 20° relative the path of movement, it is impossible to measure objects where the inclined edges have an inclination corresponding to a smaller angle relative the path of movement, for instance 15°. The corner point D according to FIG. 1 will then be hidden by the corner point A, and analogous thereto C will be hidden by B.

However, measurable cross-sectional shapes comprise not only objects having a cross-section that can be "framed" basically within a parallelogram, but also triangular shapes having sufficient inclination, since they can be regarded as a special type of quadrangle with their corner points C and D coinciding. Furthermore, it is evident that the crossing point of the scanning rays, the position of which has not been shown in the drawing and which is obtained when the ray $2n$ is extended towards the ray $1n$, does not have to be located at any definite place.

Due to more or less regular extension of the object to be measured in the depth direction, i.e. in the direction perpendicular to the plane of the drawing, it is more or less critical if both scanning rays of a pair of rays actually lie within one and the same plane, or if they are located adjacent to each other, for instance at a distance of a few mm. For this reason, it is stated herein as a condition for carrying out the scanning method of the invention that either the scanning rays themselves, or their projections on a common projection plane (for instance the plane of the drawing in FIG. 1), should cross one another.

In the arrangement illustrated in FIG. 3, two pairs of emitters 11A and 11B, and 12A and 12B, respectively, arranged in one and the same measuring plane, cooperate with respective single receivers 21 and 22, respectively. However, it should be noted that the arrangement could be such that one transmitter co-operates with two receivers arranged in one and the same measuring plane, since it will be appreciated that with the scanning method of the invention it is irrelevant in which direction the light propagates, and basically the following explanations are valid for both the latter case and the illustrated case.

Each ray 1A, 1B forms two crossing points, firstly with the ray 2A, and secondly with the ray 2B. The arrangement can be regarded as if a second sensing system had been arranged in a somewhat laterally displaced position relative to the first sensing system with the receiver (or transmitter) side combined with the original sensor system.

By the method according to FIG. 3, the position of all edges with respect to the corners can be determined independently of the orientation of the object, which, in this case, does not need to have parallel surfaces but can, for instance, have a trapezoid cross-section, and can then be placed with its larger edge either upwards or downwards. The method, according to FIG. 3, is also independent of any reference plane (such as Z in FIG. 2A), which is illustrated in FIG. 3 by three alternatives 3, 3a, 3b for the positioning of the object to be measured. This very important advantage is caused by the above mentioned circumstance that virtually two sensing systems in a mutually somewhat laterally displaced position are provided, and each corner point passes through the scanning rays of each of the two sensing systems at a slightly different position of the measured object along its path of movement.

Figure 5:
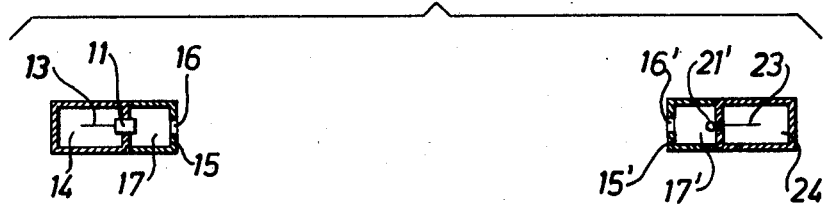

FIG. 4 illustrates a preferred measuring or scanning device operating in several mutually-parallel measuring planes, of which only three such planes, indicated at I, II and III have been shown in the drawing. The plane of the drawing in FIG. 4 can be regarded, for instance, as the plane in which the scanning ray 1n lies and which is perpendicular to the plane of the drawing of FIG. 1, while FIG. 5 is a cross-section through the device of FIG. 4 along any of the measuring planes, for instance the plane I, with the measured object 3 omitted.

A number of emitters 11, preferably of the light-emitting diode type, are arranged in a emitter spar or beam 14. Conductors 13 connect said emitters 11 to an oscillator (not shown) which operates as a current source so that modulated infra-red light is emitted thereby. At the receiver side there are a corresponding number of receivers arranged in a corresponding receiver spar or beam 24. In the preferred embodiment shown, the receivers or their optical inputs 21' are defined by front surfaces or ends of respective light conductors 23 which, in the interior of the receiver beam 24, are collected together as a bundle 23' in which they are led to non-illustrated photo-detectors, so that all electronic components are eliminated from the actual receiver beam 24. When using the above-mentioned time multiplex method, the bundle 23' from all of, or at least from a group of, inputs 21' is fed to a single photo detector in an electronic box 25.

In FIG. 4, in the lower portion of the emitter beam 14 there is shown an alternative arrangement of light emitters in analogy with the receiver arrangement shown at the right hand side of FIG. 4. The optical outputs 11' of the emitters comprise the front surfaces or ends of light conductors 113 which, within the emitter beam 14, are collected into a bundle which is led to a light source 115. Said arrangement may, optionally, be combined with the light conductor arrangement 23 at the receiver side. It is apparent that the light conductors at the transmitter side and the receiver side can be of the same type.

Particularly suitable optical inputs can be formed on the light conductors by heating the end portion of each said light conductor so that a pearl-shaped drop is formed, said drop serving to collect light and simultaneously providing means permitting mechanical attachment of the light conductor in a hole, the diameter of which corresponds to the normal diameter of the light conductor.

In front of the optical outputs of the light diodes 11 or in front of the wall of the emitter beam 14 wherein these outputs are arranged, there is arranged a plate 15 having diaphragm openings 16, there being one said opening in front of each light diode. In analogy herewith, a plate 15' having diaphragm openings 16' is arranged in front of internal wall 24' in the receiver beam 24 where the optical inputs 21' are arranged. As will be understood from the drawing, it is sufficient to arrange the diaphragm openings 16, 16' only in front of one of the two beams 14 or 24. At Y and Y' in FIG. 4. it is shown how the plate 15' at the front of the receiver beam 24 positively blocks not only light from other emitters, but also the major part of any other random light and interfering light. As will be seen in FIG. 5, the space behind the plates 17, 17' may advantageously be shaped as a channel or duct through which air for cleaning purposes can be blown, for instance in the direction of the arrows T in FIG. 4.

The device for carrying out the method according to FIG. 3 will have either a double emitter beam 14 or a double receiver beam (the second part extending below or above the plane of the drawing in FIG. 4). However, it is to be noted that usually it is not necessary to have this doubling of elements in each of a plurality of measuring planes. When measuring boards, in practice it is sufficient to have said twin function for instance at each fifth to tenth measuring plane.

It has already been stated that the object to be measured can be moved and the sensor system can be stationary, or vice versa, or both the object and the sensor system can carry out different movements simultaneously. When measuring boards, in practice the alternative in which the object to be measured is moved is preferably used, since in that case the feeding movements occurring in the transfer of the boards between different working stations in a mill can be made use of in the performance of the present invention without any special means having to be provided for moving the objects to be measured. A particular advantage arises from the fact that the boards, logs or the like do not have to be stopped for measuring, and they can be moved along at normal productional through put. Furthermore they do not have to be moved into special measuring positions as is the case with some prior methods.

I claim:

1. A method of optically scanning an object which in its cross-section shows a first edge limited by a first pair of corner points, and a second edge and a third edge issuing from the first and second corner points of the first pair respectively and terminating by a first and a second corner points of a second pair respectively, comprising the steps of: moving in a direction at least approximately parallel with the said first edge the object relative a scanning-and-sensing-system comprising at least two emitters emitting scanning rays and at least two scanning ray receivers;

aligning the scanning ray receivers with the scanning rays for producing electrical signals whenever the respective scanning ray is obturated and whenever the obturation subsequently is relieved;

producing electrical signals with a position indicator for indicating the said relative movement;

subtending a smaller angle with the scanning rays with the direction of transport than the said second and third edges;

evaluating, in correlation with the electrical signals received from the position indicator, the electrical signal received when a first scanning ray is obturated as the indication of a first corner point in the said first pair and when the second scanning ray is obturated as a first corner point in the said second pair and when the obturation of the said first scanning ray is relieved as the second corner point in the said second pair and when the obturation of the said second scanning ray is relieved as the second corner point in the said first pair.

2. A method as set forth in claim 1, characterized in that, in one cross sectional plane of the measured object, one transmitter cooperates with two angularly-spaced receivers.

3. A method as set forth in claim 1, characterized in that, in one cross sectional plane of the measured object, one receiver cooperates with two angularly-spaced transmitters.

4. A method as set forth in claim 1, characterized in that the scanning is carried out in several mutually parallel cross sectional planes of the measured object and in that all said electrical signals are supplied for collective evaluation.

5. A method as set forth in claim 1, characterized in that the scanning ray is received by a front portion of a light conductor, the end portion of which is facing the optical input of a photo detector.

6. A method as set forth in claim 4, characterized in that several emitters are successively activated according to the time multiplex method and that the corresponding light conductors on the receiver side are fed to one and the same photo detector.

7. A method as set forth in claim 6, characterized in that the emitters and receivers are adapted for modulated radiation.

8. A sensor system for use in effecting contact-free measurement of an object by optical scanning thereof to determine four corner points in the cross-section of the object comprising:

at least one pair of emitters, at least one pair of receivers for scanning rays, means for causing relative movement between the object to be measured and the sensor system, an evaluation unit for receiving signals from the receivers characterized in that the cooperating emitter-receiver pairs are so arranged that corresponding scanning rays cross each other and the scanning rays extend in inclined dispositions relative the direction of said relative movement, and a transport means adapted to transport the measured object in a direction at least approximately parallel with the first edge of the object, the emitters and receivers being so oriented that the scanning rays have an inclination relative to the direction of transport which is smaller than the inclination of the second and third edges of the object thereto.

9. A device as set forth in claim 8, characterized in that each said emitter has related thereto a respective angularly mutually-spaced pair of said receivers in one and the same cross sectional plane of the measured object.

10. A device as set forth in claim 8 characterized in that each said receiver has related thereto a respective angularly mutually-spaced pair of said emitters in one and the same cross sectional plane of the measured object.

11. A device as set forth in claim 8 characterized in that each said emitter comprises a respective light-emitting diode and that each said receiver has a photo detector portion comprising a respective photo transistor.

12. A device as set forth in claim 8 characterized in that each said receiver comprises a respective light conductor, a front portion of which is arranged for receiving the scanning ray from the respective emitter, thus to form the optical input of the entire receiver, the end portion, remote from said front portion, of said light conductor arranged opposite a light-receiving portion of a photo detector.

13. A device as set forth in claim 12 characterized in that a plurality of said emitters are arranged so as to be actuated successively according to the time multiplex system, and in that the corresponding light conductors of said receiver are led to a said single photo detector.

14. A device as set forth in claim 8 characterized in that several said sensor systems are arranged behind each other at respective mutually-parallel cross sectional planes of the measured object.

15. A device as set forth in claim 14 characterized in that the optical output of each said emitter is defined by a front surface of a respective light conductor, said conductors being fed from at least one light source.

16. A device as set forth in claim 14 characterized by the provision of respective diaphragms, each in the form of a diaphragm opening, in a plate disposed at a spacing from said receivers, for aligning each said receiver with its respective emitter.

17. A device as set forth in claim 14 characterized by the provision of respective diaphragms, each in the form of a diaphragm opening in a plate disposed at a spacing from said emitters, for aligning each said emitter with its respective receiver.

18. A device as set forth in claim 17, characterized in that the space between the front surfaces of said emitters and the respective diaphragm plate is arranged as a channel through which pressurized gaseous medium can be blown for cleaning purposes.

19. A device as set forth in claim 17 characterized by the provision of respective diaphragms, each in the form of a diaphragm opening, in a plate disposed at a spacing from said receivers, for aligning each said receiver with its respective emitter.

20. A device as set forth in claim 19, characterized in that the space between the front surfaces of said receivers and the respective diaphragm plate is arranged as a channel through which a pressurized gaseous medium can be blown for cleaning purposes.

21. A sensor system for use in effecting contact-free measurement of an object by optical scanning thereof to determine four corner points in the cross-section of the object comprising:
- a pair of emitters,
- a pair of receivers for scanning rays,
- means for causing relative movement between the object to be measured and the sensor system,
- an evaluation unit for receiving signals from the receivers characterized in that the cooperating emitter-receiver pairs are so arranged that projections of the corresponding scanning rays on a common plane parallel to the scanning rays cross each other and the scanning rays extend in inclined dispositions relative the direction of said relative movement, and
- a transport means adapted to transport the measured object in a direction at least approximately parallel with the first edge of the object, the emitters and receivers being so oriented that the scanning rays have an inclination relative to the direction of transport which is smaller than the inclination of the second and third edges of the object thereto.

22. A sensor system for use in effecting contact-free measurement of an object showing in its cross-section a first edge and second and third edges issuing from the terminal points of the said first edge by the optical scanning thereof to determine four corner points in the cross-section of the object comprising:
- a pair of emitters,
- a pair of receivers for scanning rays,
- means for causing relative movement between the object to be measured and the sensor system,
- an evaluation unit for receiving signals from the receivers characterized in that the cooperating emitter-receiver pairs are so arranged that corresponding scanning rays cross each other and the scanning rays extend in inclined dispositions relative the direction of said relative movement, and
- a transport means adapted to transport the measured object in a direction at least approximately parallel with the first edge of the object, the emitters and receivers being so oriented that the scanning rays have an inclination relative to the direction of transport which is smaller than the inclination of the second and third edges of the object thereto.

* * * * *